A. F. KOERBER.
CANDY PULLING MACHINE.
APPLICATION FILED AUG. 5, 1918.
1,282,240.
Patented Oct. 22, 1918.
2 SHEETS—SHEET 2.
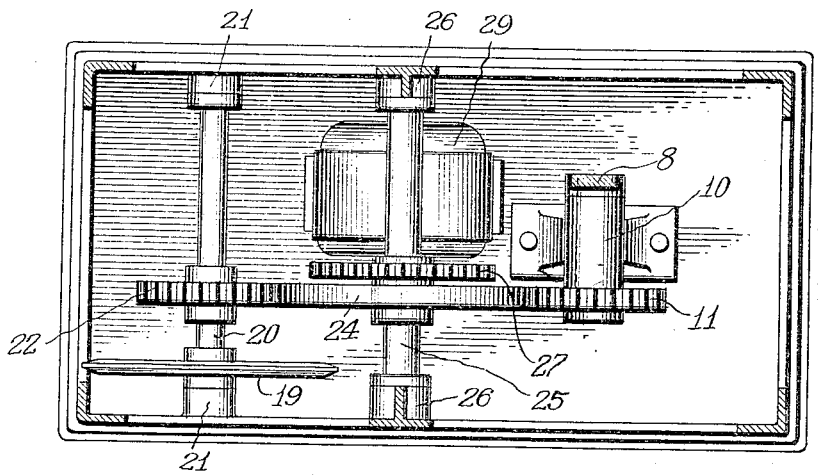
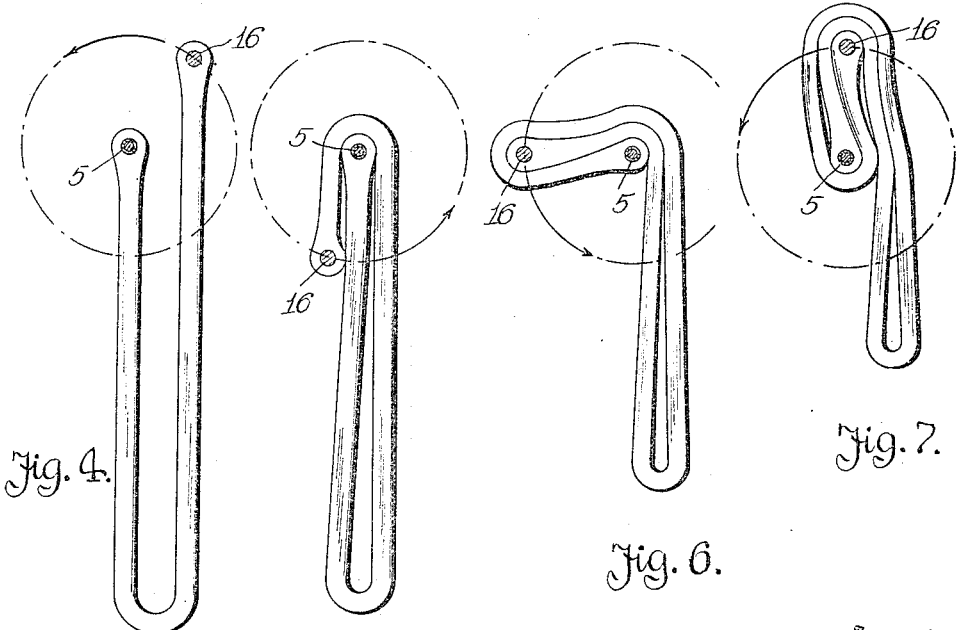

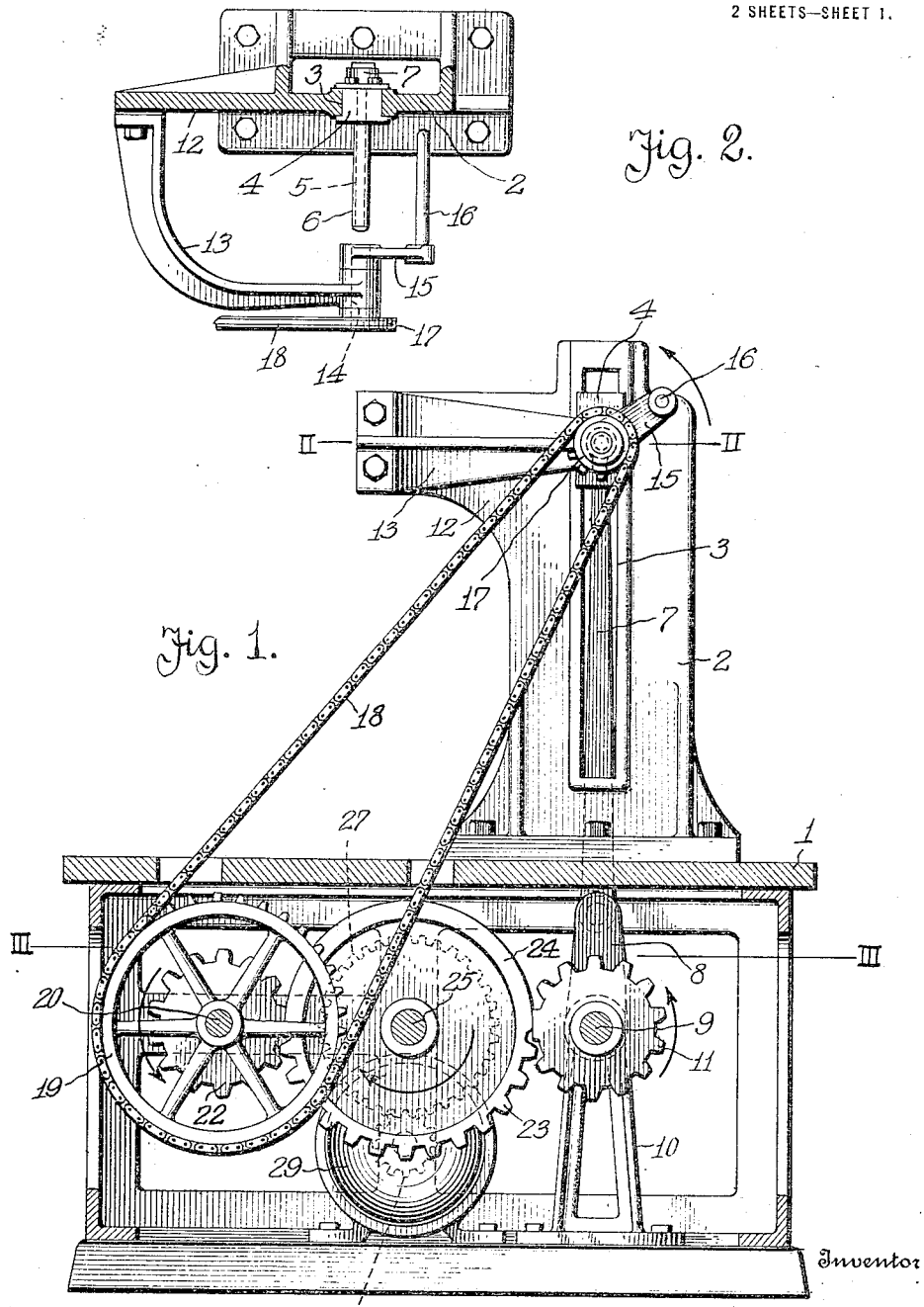

UNITED STATES PATENT OFFICE.

ANTHONY F. KOERBER, OF DETROIT, MICHIGAN.

CANDY-PULLING MACHINE.

1,282,240.  Specification of Letters Patent.  Patented Oct. 22, 1918.

Application filed August 5, 1918. Serial No. 248,283.

*To all whom it may concern:*

Be it known that I, ANTHONY F. KOERBER, a citizen of the United States of America, residing at Detroit, in the county of Wayne and State of Michigan, have invented certain new and useful Improvements in Candy-Pulling Machines, of which the following is a specification, reference being had therein to the accompanying drawings.

In my application for a candy pulling machine filed February 21, 1918, Serial No. 218,429 and allowed April 16, 1918, there is disclosed a candy pulling machine which may be considered as an improvement of my Patent No. 1,096,728, granted May 12, 1914, said allowed application showing stretching or pulling elements that are reciprocable to and from each other and connected for movement in synchronism, in combination with a lapping or gathering element that places the batch of candy in position to be stretched or pulled by the first mentioned elements. The stretching or pulling elements are in the form of two arms actuated through the medium of an endless sprocket chain, and the lapping or gathering elements are in the form of three arms that are swung about the stretching or pulling elements so as to lap or gather candy thereabout prior to the stretching or pulling arms separating to stretch the batch of candy.

A novel mechanism is employed for operating the stretching and gathering elements in timed relation, and the present invention aims to simplify the construction and arrangement of the stretching and gathering elements without sacrificing any construction that contributes to the working of candy for a desired color, texture and bulk.

My improvements will be hereinafter considered, and reference will now be had to the drawings, wherein Figure 1 is a side elevation of the machine, partly in section;

Fig. 2 is a horizontal sectional view taken on the line II—II of Fig. 1;

Fig. 3 is a similar view taken on the line III—III of Fig. 1; and

Fig. 4 to 7 inclusive, show the manipulation of a batch of candy by the stretching and gathering elements.

As in my allowed application, the machine includes a box-like framework having a table top 1 and on this table top is mounted an upright 2 provided with a vertically disposed single slot 3. Slidable in the slot 3 is a slide head 4 which has the front side thereof provided with an arm 5 supporting a revoluble sleeve or roller 6. The rear side of the head 4 is loosely connected to the upper end of the pitman 7 and said pitman has its lower end pivotally connected to a crank 8 mounted on a shaft 9, journaled in bearings 10 below the table top 1. On the shaft 9 is a gear wheel 11.

The upright 2 has a side extension 12 provided with a bracket 13, said bracket having its end extending in front of the slot 3, contiguous to the upper end thereof. Journaled in the end of the bracket 13 is a shaft 14 and mounted on the lower end of said shaft is a crank 15 having a single arm 16 extending toward the upright 2, said arm constituting the gathering element of the machine and adapted to coöperate with the reciprocable arm 5 constituting the stretching element of the machine.

The front end of the shaft 14 is provided with a small sprocket wheel 17 and trained over said sprocket wheel is an endless sprocket chain 18 that extends under a large sprocket wheel 19 mounted on a shaft 20, journaled in bearings 21 of boxlike framework of the machine.

Mounted on the shaft 20 is a gear wheel 22 longitudinally alining with the gear wheel 11, so that said gear wheel may alternately mesh with teeth 23 of a large wheel 24 mounted on a shaft 25, journaled in bearings 26 of the machine framework. The teeth 23 of the wheel 24 occupy half of the periphery of said wheel and said teeth are adapted to perform work or transmit power, while the remaining half of the wheel is inactive for power purposes.

Mounted on the shaft 25 is a large gear wheel 27 meshing with a small gear wheel 28, on the armature shaft of an electric motor 29, said motor being located within the framework of the machine, and constituting a suitable source of power for operating said machine.

With the motor 29 in operation, it is apparent that the wheel 24 will intermittently and alternately impart movement to the shafts 9 and 20, the former causing the slide head 4 to be reciprocated and the latter causing the crank 15 to be revolved with the shaft 14 as its axis.

Assuming that a batch of candy has been placed on the arms 5 and 16, when the arms are in close proximity to each other, as shown in Fig. 4, and the motor placed in operation, the arm 5 will be lowered while the arm 16 remains inactive. With the arm 5 traveling downwardly, the batch of candy is stretched and as the arm travels upwardly to normal position, the batch of candy assumes a looped or suspended formation similar to that shown in Fig. 4. Now, with a cessation in the operation of the arm 5, the arm 16 becomes active and is carried about the arm 5 in a counter-clockwise direction, thereby causing that portion of the candy adjacent the arm 16 to be swung over and lapped on the arm 5 or more strictly speaking the candy supported from said arm.

As the arm 16 completes a half revolution it again contacts with the remaining looped portion of the candy and two revolutions of said arm will eventually cause the batch of candy to be lapped and gathered about both of said arms, somewhat as shown in Fig. 7 where the arm 16 may make another half revolution to cause the batch of candy to be completely gathered on said arm. It is at this period of the operation that the arm 16 will become inactive in approximately the position shown in Fig. 4, and the arm 5 becomes active and travels downwardly so that the lapped and gathered batch of candy will be stretched, pulled and looped, as in the beginning. This operation will continue until the batch of candy is evenly pulled or manipulated until a desired color, texture and bulk is obtained.

I attach considerable importance to the fact that two arms are simply employed for manipulating the batch of candy, in contradistinction to three or more arms and it is in consequence of this construction that the machine is materially simplified and labor reduced to a minimum on the part of a candy manufacturer in keeping the machine sanitary and in proper condition.

What I claim is:—

1. In a candy pulling machine, the combination of a single reciprocable stretching element, a single gathering element adapted to swing about said stretching element when in proximity thereto, and means adapted for alternately actuating the stretching and gathering elements.

2. In a candy pulling machine, a single stretching element and a single gathering element, means adapted for reciprocating said stretching element while said gathering element remains stationary, so that a batch of candy on said element assumes a looped formation between said elements, and means adapted for revolving said gathering element about said stretching element during a cessation in the operation thereof to cause the batch of candy to be gathered about both of said elements.

In testimony whereof I affix my signature in the presence of two witnesses.

ANTHONY F. KOERBER.

Witnesses:
 KARL H. BUTLER,
 ANNA M. DORR.